United States Patent [19]

Kotthaus

[11] 4,353,671

[45] Oct. 12, 1982

[54] METHOD FOR FABRICATING GEARS WITH GENERATED TOOTH FLANKS

[75] Inventor: Erich Kotthaus, Wallisellen, Switzerland

[73] Assignee: Werkzeugmaschinenfabrik Oerlikon-Bührle AG, Zurich, Switzerland

[21] Appl. No.: 170,532

[22] Filed: Jul. 21, 1980

[30] Foreign Application Priority Data

Aug. 10, 1979 [CH] Switzerland .......................... 7346/79

[51] Int. Cl.³ .............................................. B23F 9/12
[52] U.S. Cl. ..................................................... 409/26
[58] Field of Search .............................. 409/26, 30, 53

[56] References Cited

U.S. PATENT DOCUMENTS

| | | | |
|---|---|---|---|
| 3,222,990 | 12/1965 | Rebeski | 409/26 |
| 3,288,031 | 11/1966 | Krastel et al. | 409/26 |
| 3,583,278 | 10/1968 | Baxter, Jr. et al. | 409/26 |
| 3,964,369 | 6/1976 | Hunkeler | 409/26 |

FOREIGN PATENT DOCUMENTS

| | | |
|---|---|---|
| 1226398 | 10/1966 | Fed. Rep. of Germany . |
| 1627357 | 1/1971 | Fed. Rep. of Germany . |
| 1627358 | 1/1971 | Fed. Rep. of Germany . |

*Primary Examiner*—Z. R. Bilinsky
*Attorney, Agent, or Firm*—Werner W. Kleeman

[57] ABSTRACT

In a method of manufacturing gears with rolled or generated tooth flanks by cutting-out tooth slots or spaces with at least one face-mill cutter head performing a rotational movement about a cutter head axis, wherein the production capacity or efficiency is increased in that for rough cutting the tooth slots, during a first working step, the face-mill cutter head and the workpiece perform a plunge-cut movement with respect to one another. Hence, the cutters of the face-mill cutter head initially contact the workpiece at a predeterminable plunge-cut position between end regions of a tooth slot or space which is to be fabricated. For finish cutting the tooth slots, during a further working step, there is performed a generating movement between the face-mill cutter head and the workpiece.

3 Claims, 5 Drawing Figures

METHOD FOR FABRICATING GEARS WITH GENERATED TOOTH FLANKS

CROSS-REFERENCE TO RELATED CASE

This application is related to the commonly assigned United States application Ser. No. 107,331, filed Dec. 26, 1979, and entitled "Control Apparatus for Controlling a Feed Movement In a Gear Cutting Machine". This application is also related to my commonly assigned United States application Ser. No. 06/170,759, filed July 21, 1980, entitled "Method For Fabricating Bevel and Axially Offset Gear Pairs".

BACKGROUND OF THE INVENTION

The present invention relates to a new and improved method of fabricating gears with rolled or generated tooth flanks by cutting-out tooth slots or spaces by means of at least one face-mill cutter head which performs a rotational movement about a cutter head axis, and furthermore, relates to a new and improved gear cutting machine for the performance of the aforesaid method.

There is already known to the art a method of fabricating gears according to the foregoing. With this prior art method the face-mill cutter head, in order to cut-out tooth slots or spaces, carries out in relation to the workpieces, apart from the rotational movement along a cutter head axis, only a generating or rolling motion, but no plunge-cut motion. The feed, and therefore the depth of penetration of the cutters into the workpiece thus occurs in the direction of the rolling or generating movement. As a result, rolled or generated toothed slots are formed during one machining operation.

With this method the individual cutting edges of the cutters or cutter blades of the face-mill cutter head are non-uniformly loaded. The cutting edge which first reaches the workpiece during the generating or rolling motion must perform the greatest cutting work, and therefore, also must again be first reground. Experience has shown that the highly loaded cutting edge must in fact be reground a number of times, whereas the remaining cutting edges need only be reground once. The grinding of the cutter or cutter blade is associated with an interruption in production, the duration of which is not only dependent upon the number of cutting edges which must be reground, but also upon the therewith associated work, such as dismantling of the cutters, adjusting the cutters and so forth.

Furthermore, there is known from U.S. Pat. No. 3,583,278 a method of manufacturing bevel gears, wherein the tooth slots or spaces constrict in the lengthwise direction of the teeth. With this method during a first step the tooth slots are roughed only by plunge cutting. The plunge-cut begins at the region of an end surface of the bevel gear or at an end region of the tooth slot which is to be fabricated, and with increasing tooth slot depth there also increases the length of the tooth slot. After the tooth slot or space has reached a depth which is still appreciably less than the desired final depth of the finish rough cut tooth slot, then there is initiated a rolling or generating operation. Now the tooth slot also is further cut in the lengthwise direction, so that it extends up to the other end surface of the bevel gear. Hence, there has been cut-out a tooth slot or space, the depth of which must be increased and the flank profile of which must be further improved upon. This is accomplished during a further working step, in that the tooth slot is further machined at the tooth root or base as well as at the tooth flanks, so that after the second working step the tooth slots have a shape which comes closer to that of the finished machined tooth slots.

During the fabrication of rough cut tooth slots according to the above-described method there are used different cutter heads. To cut the tooth slots to a first limited depth there are provided wide cutters, by means of which it is not possible to cut to the complete tooth slot depth. During the subsequent further rough cutting to a greater tooth slot depth it is then necessary to employ narrower, less efficient cutters.

However, this method only has an apparent similarity with the method of the present invention, since it is concerned with only part of the method for rough cutting the tooth slots. Further operating steps of the prior art method under consideration for the finish machining of such tooth slots are very cumbersome and entail a number of operating steps which must be carried out at different machines.

SUMMARY OF THE INVENTION

Therefore, with the foregoing in mind it is a primary object of the present invention to provide a new and improved method of fabricating gears with generated or rolled tooth flanks and an apparatus for use with a gear cutting machine for the performance of the method, which is not afflicted with the aforementioned drawbacks and limitations of the prior art proposals.

Another and more specific object of the present invention aims at providing a new and improved method of, and apparatus for, fabricating gears which enables increasing the production capacity of the equipment during the fabrication of gears having rolled or generated tooth flanks.

The advantages of the invention reside in the fact that the individual cutting edges tend to essentially uniformly wear, since the inner and outer cutting edges are equally markedly loaded right from the start, which in turn means that the machine need only be shutdown at relatively large time intervals in order to exchange all of the cutters or for regrinding all of the cutting edges and thus the service life of the cutters is increased and the machining time shortened.

Now in order to implement these and still further objects of the invention, which will become more readily apparent as the description proceeds, the method of manufacturing gears with rolled or generated tooth flanks during the cutting-out of tooth slots as contemplated by the present development is manifested by the features that for the rough cutting of the tooth slots, during a first working step, the face-mill cutter head and the workpiece carry out a plunge-cut motion in relation to one another and thus the cutter of the face-mill cutter head initially contacts the workpiece at a predeterminable plunge-cut position between end regions of a tooth slot which is to be fabricated. For the finish cutting of the tooth slots, during a second working step, there is performed a generating or rolling motion between the face-mill cutter and the workpiece.

As already mentioned heretofore, the invention is also concerned with a new and improved construction of apparatus for a gear cutting machine for the performance of the aforementioned method aspects, wherein there are provided means for setting a generating or roll drum at predeterminable plunge cut positions.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
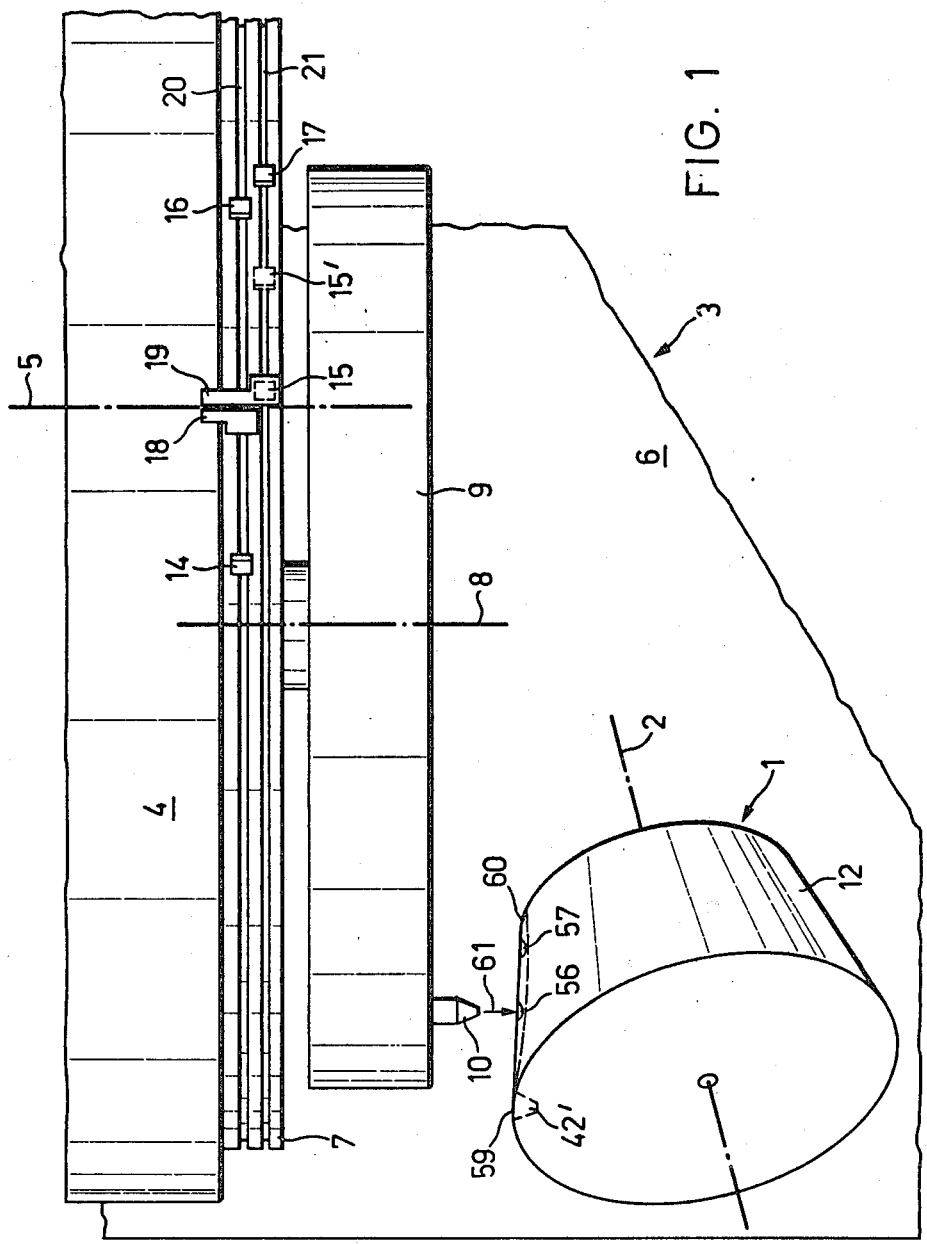
FIG. 1 schematically illustrates part of a gear cutting machine according to the invention.

Describing now the drawings, in FIG. 1 there will be recognized a bevel gear blank constituting a workpiece 1 which, in a not here further illustrated but conventional and well known manner, is mounted to be rotatable at a gear cutting machine 3 about a workpiece axis 2. As a further well known component of the conventional gear cutting machine 3 there will be recognized a generating or roll cradle 4 which is displaceably mounted in the direction of a generating or roll axis 5 upon a partially shown socket or pedestal 6 or equivalent structure. A generating or roll drum 7 is rotatably mounted in the generating or roll cradle 4 about the generating or roll axis 5. This generating or roll drum 7 carries an end or face-mill cutter head 9 which is rotatable about a cutter head axis 8. Protruding out of the face-mill cutter head 9, in the direction of the workpiece 1, are the cutters or cutter blades 10, wherein as a matter of convenience in illustration only one such cutter 10 has been shown. Reference character 12 designates a circumferential surface of the workpiece 1.

Dogs or cams 14, 15, 16 and 17 or equivalent structure are provided at the generating or roll drum 7, and at the generating or roll cradle 4 there are provided switches 18 and 19. The cam or dog 15 is shown in a position where it is just covered by the switch 19, and it is for this reason that it has been illustrated in broken lines. The cams or dogs 14 and 16 are displaceable and individually fixable along a track 20, and the cams or dogs 15 and 17 are displaceable and individually fixable along a track 21 or equivalent structure.

Figure 2:
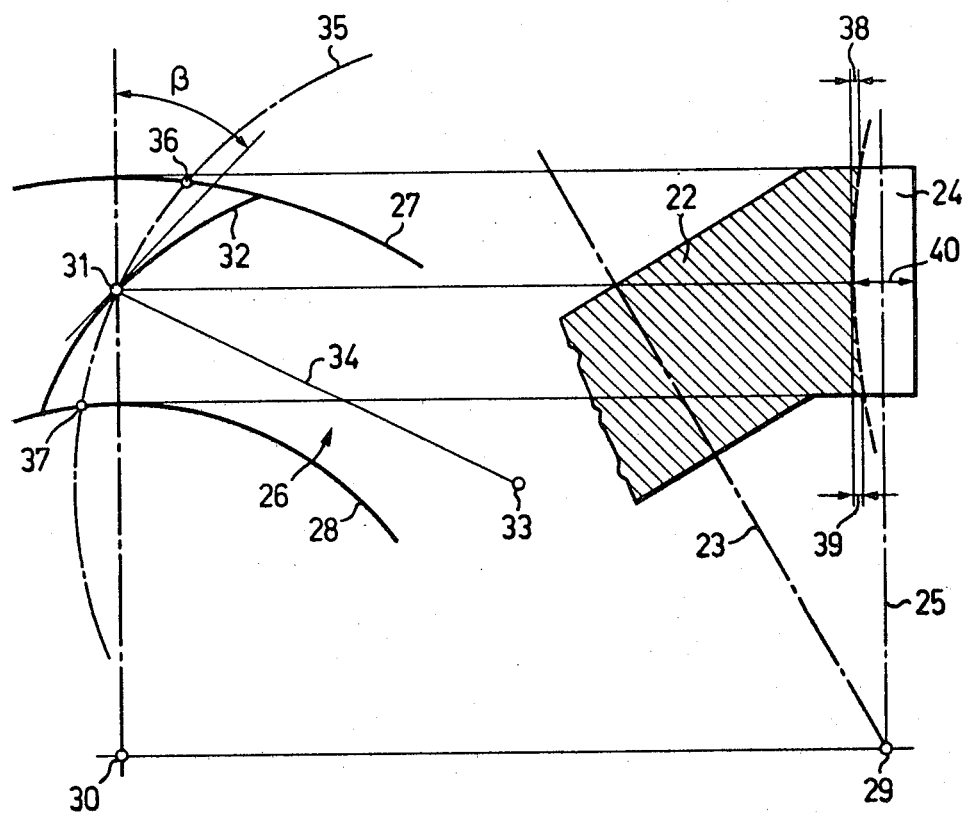
FIG. 2 illustrates the geometric relationships prevailing during the procedure of a bevel gear.

Now in FIG. 2 there will be recognized as the workpiece a bevel gear 22 in partially sectional and fragmentary illustration, this bevel gear 22 having an axis 23. At the bevel gear 22 there is to be cut-out a tooth slot or space 24. Reference character 25 designates a generatrix of the partial or incremental surface of the bevel gear 22.

The left-hand portion of the showing of FIG. 2 illustrates in top plan view the pitch plane 26 of a crown gear and thus is disposed perpendicular to the side view illustrated at the right-hand half of the illustration of FIG. 2. The crown gear is limited by the arcuate sections 27 and 28 and meshes with the bevel gear 24. The generatrix 25 of the partial surface of the bevel gear 22 therefore also appears in the pitch plane 26. The intersection point 29 between the axis 23 of the bevel gear 22 and the generatrix 25 is therefore identical with the center 30 of the crown gear 27, 28. Reference character 31 designates a computation point of a tooth lengthwise line 32. The cutter head axis 8 of the face-mill cutter head 9, according to the showing of FIG. 1, intersects the pitch plane 26 of the crown gear 27, 28 (FIG. 2) at a point 33 and the cutters 10 rotate along an arc 35 having the radius 34. Since in the embodiment under discussion one is concerned for instance with a continuous cutting method, the tooth lengthwise line 32 has a different curvature and a different center than the arc 35.

By determining the elevational difference between the partial surface of the bevel gear 22 and the pitch plane 26 of the crown gear 27, 28 at the points 36 and 37 there can be derived the cut depth deviations 38, 39 in relation to the cut depth 40 at the computation point 31. Such cut or cutting depth deviations 38, 39 are that much greater the greater that there is selected the spiral angle $\beta$.

Figure 3:
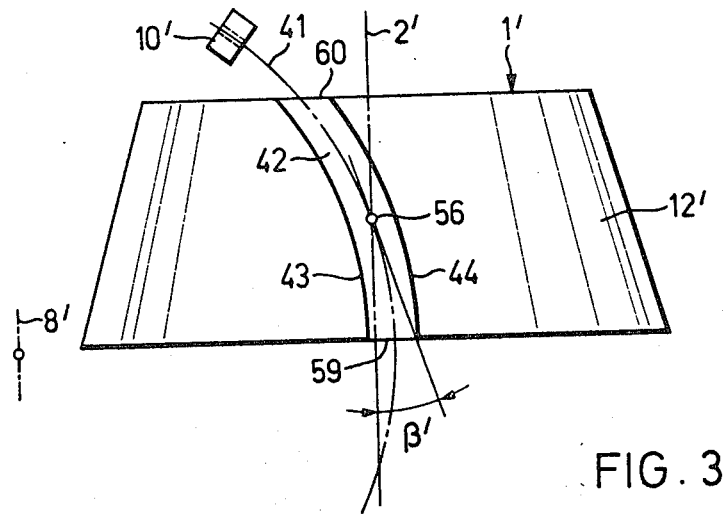
FIGS. 3 and 4 schematically illustrate in front view a bevel gear having a tooth slot or gap during the fabrication of such bevel gear.

FIG. 3 schematically illustrates in front view a workpiece 1' having an axis 2'. Reference character 41 designates the slightly elliptical-shaped path through which rotatably passes a cutter 10' about a cutter head axis 8' which is slightly inclined with respect to the plane of the drawing. The cutter 10' thus cuts-out tooth slot or space 42, which is this case is represented by both of the boundary lines 43 and 44 at the circumferential surface 12'. Both ends of the tooth slot 42 and their immediate surroundings are designated as end regions 59 and 60. The selected spiral angle $\beta''$ is relatively small. As the cutter 10' there also can be used and therefore there should be understood a group of cutters composed of a number of individual cutters or cutter blades.

Figures 4, 5:
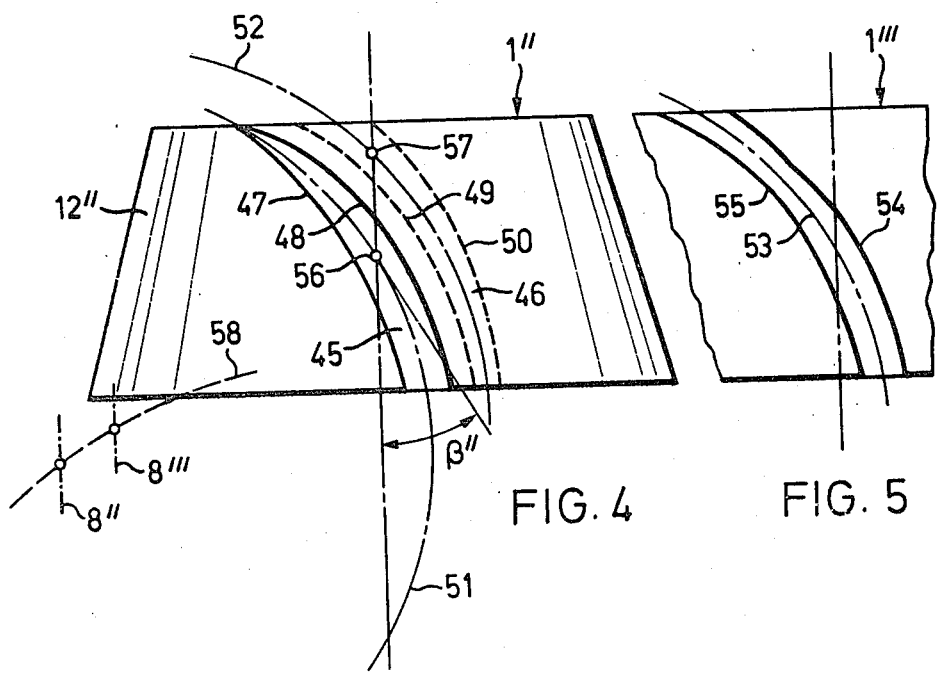
FIG. 5 schematically illustrates in fragmentary view a bevel gear having a tooth slot.

According to the showing of FIG. 4, and analogous to the illustration of FIG. 3, there is cut-out at the workpiece 1'' a tooth slot or space 45 having a larger spiral angle $\beta''$, the tooth slot 45 being illustrated by boundary lines 47 and 48 at the circumferential surface 12''. Such tooth slot 45 is cut-out with a face-mill cutter head which rotates about a cutter head axis 8''. A further broken illustrated tooth slot or space 46 containing the boundary lines 49 and 50 is rotatably cut-out with the same face-mill cutter head, but the rotation being about the cutter head axis 8'''.

FIG. 5 illustrates a combination of the tooth slots 45 and 46 of the arrangement of FIG. 4, wherein there is formed a tooth slot 53 containing the boundary lines 54 and 55.

Having now had the benefit of the foregoing discussion the mode of operation of the apparatus of the invention and the novel method of fabricating gears with rolled or generated tooth flanks will be described and is as follows:

In order to cut a tooth slot in a workpiece 1 the following procedures are undertaken. After the workpiece 1 is chucked in conventional manner upon the gear cutting machine 3, it is necessary to initially determine a plunge-cut position. This is accomplished in that for instance, the cam 15 is fixed along the track 21 in a predetermined position. This means that at the start of the machining operation the generating drum 7 is rotated until the cam or dog 15 activates the switch 19. Consequently, the rotation of the generating drum 7 is interrupted and the generating or roll cradle 4 begins to move towards the workpiece 1. Hence, the face-mill cutter head 9 begins to rotate about the cutter head axis 8. Depending upon the position of the cam or dog 15, and thus, the position of the generating or roll drum 7, the cutters 10 of the face-mill cutter head 9 begin to carry out a plunge-cut at a predetermined plunge-cut position 56, 57 in the direction of the arrow 61 at the workpiece 1 between the end regions 59, 60 of a tooth slot or space 42' which is to be fabricated. In this respect a plunge-cut position 56 approximately at the center between the end or terminal regions 59, 60 is particularly advantageous for small spiral angles $\beta'$ (see FIG. 3), since such produces boundary lines 43 and 44 whose course results in only a slightly reduced tooth slot depth at the region of the tooth slot ends.

Now in FIG. 2 there have been shown cutting depth deviations 38 and 39 for a comparable spiral angle $\beta$. The fact that the spiral angle $\beta$ of FIG. 2 appears to be greater than the spiral angle $\beta'$ of FIG. 3 is attributable to the fact that the spiral angle $\beta$ is valid for a tooth slot or gap 24 which is fabricated according to a continuous method, whereas the spiral angle $\beta'$ is valid for a tooth slot 42 which is fabricated according to an individual indexing method. The difference resides in the fact that with a continuous method the workpiece rotates during the cutting operation. Therefore the continuous method allows larger spiral angles $\beta$ for the same cutting depth deviations 38 and 39.

Now if the cutters of the end or face-mill cutter head 9 have plunge-cut the workpiece 1 up to the desired tooth slot depth, then the tooth slots 24 and 42 are thus finish rough cut and there is initiated the return stroke for the generating or roll cradle 4 in conventional manner. With a continuous cutting method the entire circumference or periphery of the workpiece 1 is provided with tooth slots or spaces 24. During the individual indexing method the face-mill cutter head, after completing the first tooth slot 42, is again retracted therefrom and the workpiece 1 is indexed or further rotated through one tooth division or pitch, and the plunge-cut operation again is repeated until also in this case the entire workpiece 1 is provided with tooth slots or spaces 42.

The thus rough cut tooth slots 24 and 42 now must be finish cut. To this end the generating drum 7, after completion of the return stroke, continues to rotate until the cams 16 and 17 simultaneously activate the switches 18 and 19, respectively. Then there is again begun a plunge-cut stroke, which is thereafter replaced by a generating motion, which is completed when the cam or dog 14 activates the switch 18. Thereafter the generating or roll cradle 4 again carries out a return stroke and the gear is finished. The gear is completely fabricated at that time if the gear is produced according to a continuous generating method. With an individual indexing method these operations are repeated in analogous fashion a number of times. Due to such generating motion the tooth flanks now have imparted thereto their final profile or shape.

In the case of larger spiral angle $\beta''$ (FIG. 4) or smaller gear diameter, a one-time plunge-cut at the plunge-cut position 56 but along the tooth slot 45 results in greater differences in the tooth slot depth. The course of the boundary lines 47 and 48 supports the conclusion that at one end of the tooth slot 45 the tooth slots depth is equal to null. A plunge-cut in the plunge-cut position 57 produces a tooth slot or space 46 with uniform tooth slot depth, as indicated by the course of the boundary lines 49 and 50. But also in this case there are perceivable greater tooth slot width differences, and thus, greater tooth slot depth differences.

In such case it is advantageous both in the plunge-cut position 56 and also in the plunge-cut position 57 to carry out a plunge-cut operation, producing an appreciably more uniform tooth slot 53 (FIG. 5), as indicated by the course of the boundary lines 54 and 55. To this end a further cam or dog 15' must be arranged at the generating drum 7, in order to trigger a further plunge-cut motion. Of course, the workpiece 1'' must be rotated in relation to the face-mill cutter head between both of the plunge-cut positions 56 and 57, so that during a double plunge-cut there is formed a single tooth slot or space 53. The arc 58 in FIG. 4 determines the geometric location of possible positions of the cutter head axis 8'', 8''', and the cutter head axes 8'', 8''' are correlated to the plunge-cut positions 56 and 57.

Depending upon the nature of the workpiece, whether such is a spur gear, bevel gear and so forth, and the nature of the desired teeth, it is particularly advantageous to provide a multiplicity of plunge-cut positions along a tooth slot. This however does not produce any appreciable prolongation of the machining time, since the plunge-cut operations can be accomplished extremely rapidly.

As already indicated, the method of the invention can be beneficially employed both for continuous fabrication techniques as well as for individual indexing techniques. Equally, the method is capable of being effectively used for fabricating gears produced according to the generating crown gear method or the generating mating gear method. The use of this method upon machines having a number of stations and cutter heads, or upon a number of machines which are specialized for performing one or another method step, likewise falls within and is intended to be encompassed by the scope of the appended claims.

While there are shown and described present preferred embodiments of the invention, it is to be distinctly understood that the invention is limited thereto, but may be otherwise variously embodied and practiced within the scope of the following claims. Accordingly,

What I claim is:

1. A method of fabricating gears having generated tooth flanks by cutting-out tooth slots with at least one face-mill cutter head carrying out a rotational movement about a cutter head axis, comprising the steps of:
   providing a face-mill cutter head and a workpiece at which there are to be cut tooth slots;
   during a first working step for the purpose of rough cutting the tooth slots carrying out a plunge-cut movement between the face-mill cutter head and the workpiece;
   during such plunge-cut movement cutters of the face-mill cutter head initially contacting the workpiece at a predeterminable plunge-cut position between end regions of a tooth slot which is to be fabricated; and
   during a further working step for the purpose of finish cutting the tooth slot performing a generating motion between the face-mill cutter head and the workpiece.

2. The method as defined in claim 1, wherein:
   said first working step encompasses a number of plunge-cut movements during the initial contact between the cutters and the workpiece at a number of predeterminable plunge-cut positions between the end regions of the tooth slot.

3. The method as defined in claim 1, further including the steps of:
   rough cutting and finish cutting the workpiece during a single chucking operation.

* * * * *